(12) United States Patent
Blewer et al.

(10) Patent No.: US 11,474,809 B2
(45) Date of Patent: Oct. 18, 2022

(54) UPGRADES BASED ON ANALYTICS FROM MULTIPLE SOURCES

(71) Applicant: Hewlett-Packard Development Company, L.P., Spring, TX (US)

(72) Inventors: Ronnie Glenn Blewer, Spring, TX (US); Amit Kumar Singh, Spring, TX (US); Aleksei Shelaev, Spring, TX (US); Mengqi Hei, Spring, TX (US); Prateek Tiwari, Pune (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/262,065

(22) PCT Filed: Feb. 1, 2019

(86) PCT No.: PCT/US2019/016401
§ 371 (c)(1),
(2) Date: Jan. 21, 2021

(87) PCT Pub. No.: WO2020/159548
PCT Pub. Date: Aug. 6, 2020

(65) Prior Publication Data
US 2021/0357201 A1 Nov. 18, 2021

(51) Int. Cl.
*G06F 8/65* (2018.01)
*G06F 21/62* (2013.01)
(52) U.S. Cl.
CPC ............ *G06F 8/65* (2013.01); *G06F 21/6245* (2013.01)

(58) Field of Classification Search
CPC ... G06F 8/65; G06F 8/658; G06F 8/70; G06F 21/6245; G06F 21/6254
See application file for complete search history.

(56) References Cited

U.S. PATENT DOCUMENTS

| | | | |
|---|---|---|---|
| 5,867,714 A | 2/1999 | Todd et al. | |
| 6,414,868 B1 | 7/2002 | Wong et al. | |
| 8,176,483 B2 | 5/2012 | Hoefler et al. | |
| 8,332,366 B2 | 12/2012 | Schumacher et al. | |
| 8,949,814 B2 | 2/2015 | Green et al. | |

(Continued)

FOREIGN PATENT DOCUMENTS

EP 2801935 A1 11/2014

*Primary Examiner* — Duy Khuong T Nguyen
(74) *Attorney, Agent, or Firm* — Perry + Currier Inc

(57) ABSTRACT

An example of an apparatus including a memory storage unit to store telemetry data collected from a plurality of sources, wherein each source of the plurality of sources maintains confidentiality. The apparatus further includes an anonymizing engine to remove identifying information from the telemetry data to generate anonymized data. The apparatus also includes a communication interface to receive request from a client device for an upgrade. The request includes a requesting device configuration of the client device. The apparatus also includes a selection engine to select a subset of the anonymized data based on the requesting device configuration. Furthermore, the apparatus includes a comparison engine to analyze the subset of the anonymized data to determine a probability of an upgrade failure at the client device. Additionally, the apparatus includes an upgrade engine to implement the upgrade on the client device based on the probability.

6 Claims, 6 Drawing Sheets

(56) References Cited

U.S. PATENT DOCUMENTS

| | | | |
|---|---|---|---|
| 8,978,027 B2 | 3/2015 | Haemel et al. | |
| 2007/0157192 A1* | 7/2007 | Hoefler | G06F 8/65 |
| | | | 717/168 |
| 2008/0209116 A1 | 8/2008 | Caulkins | |
| 2008/0301783 A1 | 12/2008 | Abrutyn et al. | |
| 2014/0101058 A1 | 4/2014 | Castel et al. | |
| 2014/0336791 A1 | 11/2014 | Asenjo et al. | |
| 2016/0132420 A1 | 5/2016 | Kuo et al. | |
| 2016/0269319 A1* | 9/2016 | Wise | G06F 9/5027 |
| 2016/0300269 A1 | 10/2016 | Bandera et al. | |
| 2017/0034023 A1* | 2/2017 | Nickolov | H04L 43/0817 |
| 2018/0129492 A1 | 5/2018 | Singh et al. | |
| 2018/0189046 A1* | 7/2018 | Kunisetty | G06F 11/2289 |
| 2018/0302303 A1 | 10/2018 | Skovron et al. | |
| 2019/0163517 A1* | 5/2019 | Fontoura | G06F 9/5005 |

\* cited by examiner

UPGRADES BASED ON ANALYTICS FROM MULTIPLE SOURCES

BACKGROUND

Client devices, such as computing devices typically run software programs that use various resources, such as memory. Over time, the software applications running on the client devices may become due for upgrades to provide additional modernized features as well as to improve security. Software upgrades generally increase the demand on the resources of the device since new features of the software may use additional processor capacity and/or memory capacity.

BRIEF DESCRIPTION OF THE DRAWINGS

Reference will now be made, by way of example only, to the accompanying drawings in which.

DETAILED DESCRIPTION

Figure 1:
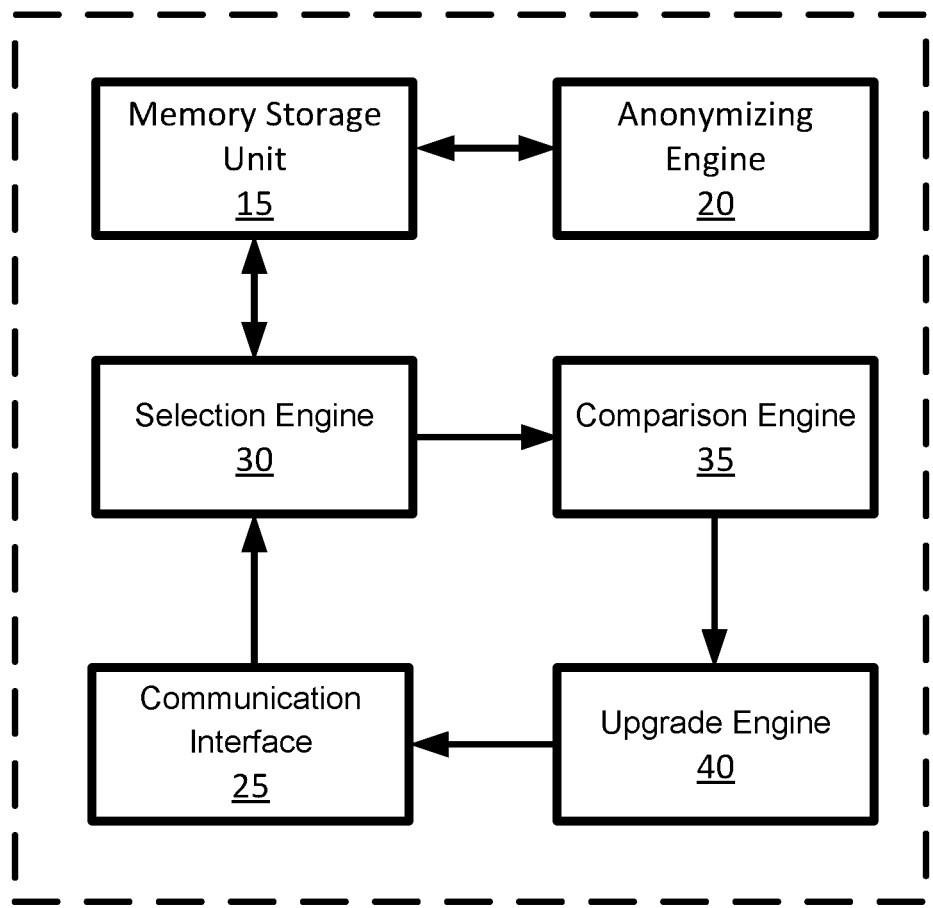
FIG. 1 is a block diagram of an example apparatus to manage client devices and the implementation of an upgrade at a client device.
Figure 1:

Devices connected to a network may be widely accepted and may often be more convenient to use. In particular, new services have developed to provide devices as a service where a consumer simply uses the device while a service provider maintains the device and ensures that its performance is maintained at a certain level. In addition, the service provider is to maintain confidentiality between clients using the service. For example, if the service provided were to manage a plurality of client devices for an entity, such as company A, as well as another plurality of client devices for another entity, such as company B, confidentiality is to be maintained so that the data of company A does not fall into the hands of company B. In particular, the number and types of client devices used by company A, which includes information about the hardware and software for each of the client devices, may be considered confidential information and to be kept secret from company B.

Part of the maintenance that is performed includes carrying upgrades to software installed on the client devices, such as upgrading an operating system. Upgrading software on client devices is done to maintain security of the devices and to fix bugs that may have been present in prior versions. As each client device may include different hardware and software configurations, the effect of the upgrading the software on a client device may be unpredictable. Although manufacturers generally provide guidelines and recommended hardware and software configurations, client devices deployed in the field may often have other components installed that may use resources of the client device. Accordingly, upgrading a client device may result in an unintended consequence, such as a decrease in device performance which may frustrate a user of the client device. In addition, software upgrades may result in bloat as new versions may used additional resources, such as more memory, to provide a better user experience.

The hardware configuration of each client device may be chosen at the time the device is introduced into service based on various factors such as expected use. To make efficient use of resources on the device, it is to be appreciated that the use of resources is to be close to the maximum available resources. However, the demands on the client device may vary over a period of time. For example, if the client device is a personal computing device, such as a laptop or tablet, demands on resources, such as memory, may vary depending on the functions carried out by user of the client device as the role of the user evolves in an organization.

To predict the effect of a software upgrade may help decide whether the software upgrade is to proceed. For example, if the software upgrade is to likely result in a failure, such as significantly decreased performance on the client device or introduction of incompatibility issue, the software upgrade may be postponed pending an upgrade to hardware or reconfiguration of the software on the client device. On the other hand, if the software upgrade is not likely to result in a failure, the software upgrade is to be implemented on the client device. In general, there determination of whether a software upgrade is to be carried out may be performed by consultants who may evaluate the effect of an upgrade to a specific client device or class of client devices. This may introduce an element of subjective decision making into the process. By performing the analysis with an apparatus that applies the rules to all devices, an objective measure is provided to determine the probability of failure after a software upgrade. Accordingly, the apparatus increases the accuracy and the objectivity of the analysis. Furthermore, the apparatus provides a process for handling data from multiple sources between which confidentiality is to be maintained. By anonymizing data such that no identifying features are presented, the apparatus has a much larger number of client devices from which telemetry data may be collected to be used in the comparison.

Referring to FIG. 1, an example of an apparatus to manage client devices and the implementation of an upgrade at a client device is generally shown at 10. In the present example, the apparatus 10 includes a memory storage unit 15, an anonymizing engine 20, a communication interface 25, a selection engine 30, a comparison engine 35, and an upgrade engine 40. Although the present example shows the anonymizing engine 20, the selection engine 30, the comparison engine 35, and the upgrade engine 40 as separate components, in other examples, any combination of the anonymizing engine 20, the selection engine 30, the comparison engine 35, and the upgrade engine 40 as separate components may be part of the same physical component such as a microprocessor configured to carry out multiple functions. The apparatus 10 may also include additional components, such as additional memory storage units, interfaces to communicate with other devices, and further input and output devices to interact with an administrator with access to the apparatus 10.

In the present example, the memory storage unit 15 may include a non-transitory machine-readable storage medium that may be any electronic, magnetic, optical, or other physical storage device. The memory storage unit 15 may also maintain a database to store telemetry data collected from a plurality of sources, such as a company using a device as a service system to manage its client devices. It is to be appreciated that the company using the device as a service system may operate several different client devices and that the client devices may not be identical. For example, the company may add devices to be managed as the company grows. As technology and client devices evolve, subsequent additions of devices may be different from earlier devices. Furthermore, the number of client devices as well as the configurations of the client devices used by a company may be a trade secret related to the operations of the company. Accordingly, each source of the telemetry data may be a separate company using the device as a service system and that confidentiality between the different sources is to be maintained.

The telemetry data received from each source is not particularly limited. In the present example, the telemetry data may be received from each client device associated with the source (referred to herein as a "source device"). Accordingly, the telemetry data may include information such as a device identifier, model number, client identifier, hardware specifications, and a list of software installed on each source device. In particular, the telemetry data collected from a source device may describe the configuration of the source device. For example, the telemetry data may provide information regarding a resource capacity which may affect the likelihood of a successful upgrade.

The specific resource capacity is not particularly limited and may include a memory capacity, such as random access memory. In other examples, the resource capacity may be a processor capacity, such as the number and speed of processors in the client device. In another example, the resource capacity may be a non-volatile memory capacity, such as a hard drive capacity. The telemetry data may also include hardware information, such as smart drive information, firmware revision, disk physical information like model, manufacturer, self-test results, and battery information.

Since the telemetry data is collected from multiple sources, the telemetry data may include enough information to identify the source as well as provide a clear indication of how the entity associated with the source has set up their network. This may provide a competitor of the entity an opportunity to study the operations of the entity which may give the competitor ideas that may be considered a trade secret related to the operations of a company. Therefore, although the telemetry data is centrally stored on the memory storage unit 15, confidentiality of the records associated with the telemetry data in the memory storage unit 15 is to be maintained such that one source of telemetry data cannot view the telemetry data received from another source.

The anonymizing engine 20 is in communication with the memory storage unit 15. In the present example, the anonymizing engine 20 is to remove identifying information from the telemetry data to generate anonymized data. The anonymizing engine 20 may remove confidential information from the telemetry data, but maintains all other information of the telemetry data, such as the general hardware configuration of the client device. For example, confidential information of the client device may include personal information that may be part of certain applications, as well as identification information that may associate a client device with a specific source, such as device identifiers, network information, and names and device history. In this example, the hardware configuration may include information such as the type or model of the client device, the amount of memory, the model or type of processor as well as the speed, the graphics card, and other installed components of the client device.

In some examples, the anonymizing engine 20 may use an indexing key to replace the confidential telemetry data with an index value or another anonymous identifier, such as a generic identifier, or a sequential serial number. Therefore, the anonymized data generated by the anonymizing engine 20 may be de-anonymized with the appropriate decryption key or lookup table. By having the ability to restore the original telemetry data from the anonymized data, an audit may be subsequently performed if requested to verify that the telemetry data was correct.

The communication interface 25 is to communicate over a network in general to send and receive messages from other devices. In the present example, the communication interface 25 may be to receive a request from a client device for an upgrade. The request may be received from the client device running an automatic check for new upgrades. Alternatively, the request may be generated at the client device based on input from a user of the client device. The request received by the communication interface 25 may also include information regarding the configuration of the client device. The information is not particularly limited and may be similar to the telemetry data received from other devices from other sources discussed above.

In other examples, the request for an upgrade may not include device configuration data. For example, if the client device from which the request is received is a managed device in a device as a service system, the memory storage unit 15 may already include the device configuration of the client device. Accordingly, in this example, the device configuration may be obtained without receiving it via to communication interface 25. In another example, the communication interface 25 may be to transmit an upgrade command to the client device in systems where the upgrade is mandated by a policy. In this example, the command may be issued by the upgrade engine 40 after considering the probability of an upgrade failure as discussed in greater detail below.

The manner by which the communication interface 25 receives the request from a client device is not particularly limited. In the present example, the apparatus 10 may be a cloud server located at a distant location from the client devices which may be broadly distributed over a large geographic area. Accordingly, the communication interface 25 may be a network interface communicating over the Internet. In other examples, the communication interface 25 may connect to the client devices via a peer to peer connection, such as over a wire or private network.

The selection engine 30 is in communication with memory storage unit 15 and the communication interface 25. In the present example, the selection engine 30 is to receive the device configuration of the client device requesting an upgrade from the communication interface 25. In addition, the selection engine 30 is to select a subset of the anonymized data in the memory storage unit 15 based on the device configuration. In particular, the selection engine 30 selects the subset of anonymized data from devices that have attempted to carry out the upgrade being requested by the client device.

The manner by which the selection engine 30 selects the subset of anonymized data is not limited. In the present example, the selection engine 30 searched the anonymized data from devices across multiple sources which have attempted to carry up the requested upgrade. For example, if the request received by the communication interface 25 is for upgrading an operating system from a first version to a second version, the selection engine 30 may select all anonymized data from devices that have attempted to carry out an upgrade of the operating system from the first version to the second version.

In other examples, the selection engine 30 may be more selective and filter the devices from the anonymized data that have attempted to carry out an upgrade of the operating system from the first version to the second version. The manner by which the anonymized data is filtered is not particularly limited. For example, the selection engine may filter the anonymized data based on the similarity between the device configurations of the source devices providing the telemetry data and the device configuration of the requesting device. The degree of similarity between the source devices and the requesting device is also not particularly limited and may be based on predetermined thresholds. For example, the selection engine 30 may select a subset of anonymized data having substantially identical memory capacities. As another example, the selection engine 30 may select a subset of anonymized data having substantially identical processor configurations, such as the same number and models of processing cores. As another example, the selection engine 30 may select a subset of anonymized data having substantially identical graphics processing capabilities. The selection engine 30 may also select anonymized data based on any combination of characteristics of the source devices.

In other examples, instead of filtering source device with substantially identical components, the selection engine 30 may select devices with capacities that fall within a predetermined threshold. For example, the selection engine 30 may select a subset of anonymized data having a resource capacity within a specified percentage or range of the resource capacity. Continuing with this example, if the requesting device is a client device with 16 GB of random access memory, the selection engine may select source devices with 16 GB or less of random access memory.

In some examples, the selection engine 30 may also apply a weighting factor to the anonymized data based on the similarity of the source device to the requesting device. The manner by which the selection engine 30 applies the weighting factor is not limited. For example, if the anonymized data is to be used to calculate a probability of an upgrade failure, the amount that a source device contributes to the determination of the probability may be weighted. As an example, if the source device has a greater resource capacity than the requesting device experience an upgrade failure, that may be more influential on the determination of the probability than if the source device has a lower resource capacity than the requesting device. In this example, the addition resource capacity of the requesting device may be sufficient to overcome the upgrade failure experienced by the source device.

The comparison engine 35 is to analyze the subset of anonymized data to determine a probability of an upgrade failure at the client device requesting the upgrade. The manner by which the comparison engine 35 makes the determination is not limited. For example, the comparison engine 35 may take a simple percentage of all source devices in the subset of anonymized data where the upgrade was not carried out successfully. The definition of an unsuccessful upgrade is not limited and may be dependent on the request originally received by the communication interface. For example, an unsuccessful upgrade may be defined as an upgrade where the device is rendered inoperable, often referred to as bricking. In other examples, an unsuccessful upgrade may generate error screens on the device such that the upgrade is rolled back. In another example, an unsuccessful upgrade may result in a device that operates with significant lags and provides a user experience that is below a certain level that may be subjective to the user or objectively measured.

The determination of the probability of an upgrade failure may also involve weighting the results of each attempted upgrade in the subset of anonymized data. The weighting factor applied may be dependent on the similarity of the source device to the requesting device as discussed above.

The upgrade engine 40 is to implement an upgrade at the requesting client device based on the probability of an upgrade failure determined by the comparison engine 35. For example, if the probability of an upgrade failure calculated by the comparison engine 35 is under a predetermined threshold, the client device may be considered to be a good candidate for the requested upgrade to be implemented. Alternatively, if the probability of an upgrade failure is above the threshold probability, the upgrade will not be implemented at the client device due to the risk of a failure of the client device upon attempting to upgrade the client device. In the case the client device is not upgrade, an error message may be generated by the upgrade engine 40 and provided to the client device.

The manner by which the upgrade engine 40 implements the upgrade is not limited. For example, the upgrade engine 40 may prompt a user of the client device to download and install the upgrade upon approval based on the probability of an upgrade failure. In other examples, the upgrade engine 40 may push the upgrade to the client device without further input from the user, such as in a managed client device.

Figure 2:
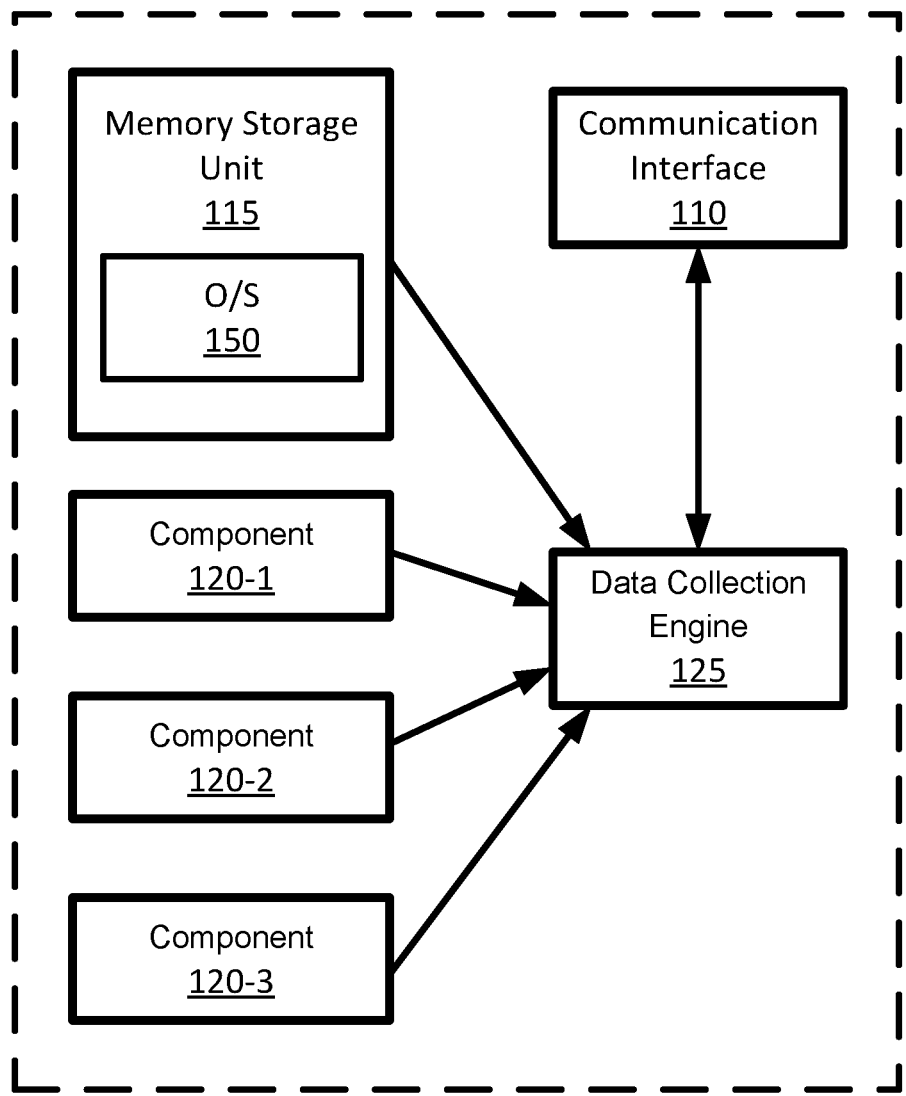
FIG. 2 is a block diagram of an example client device to collect the telemetry data to forward to the apparatus and to request an upgrade.
Figure 3:
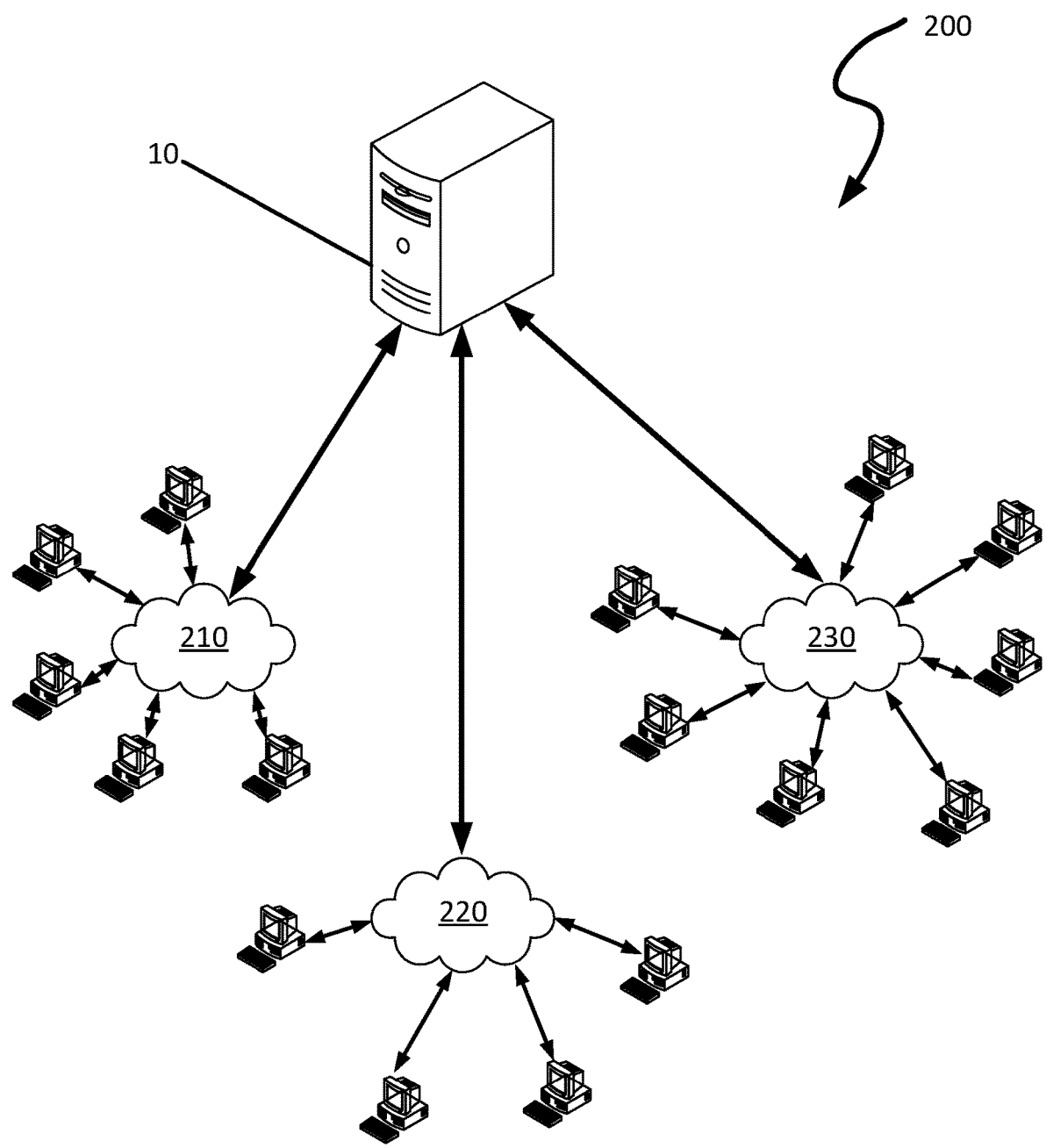
FIG. 3 is a representation of an example system to manage client devices and the implementation of an upgrade at a client device.

Referring to FIG. 2, an example of a client device which may provide the telemetry data to be stored in the memory storage unit 15 of the apparatus 10, or which may request an upgrade is generally shown at 100. The client device 100 is not particularly limited and may be any other device managed by the apparatus 10, such as a shared device like a desktop computer, a tablet, or a smartphone. The client device 100 may include additional components, such as various memory storage units, interfaces to communicate with other devices, and may include peripheral input and output devices to interact with a user. In the present example, the client device 100 includes a communication interface 110, a memory storage unit 115 for storing data as well as an operating system 150, and a plurality of components 120-1, 120-2, 120-3 (generically, these components are referred to herein as "component 120" and collectively they are referred to as "components 120", this nomenclature is used elsewhere in this description).

The communication interface 110 is to communicate with the apparatus 10 over a network. In the present example, the client device 100 may be connected to a cloud to be managed by the apparatus 10 in the cloud. Accordingly, the communication interface 110 may be to transmit telemetry data to the apparatus 10 to be stored on the memory storage unit 15. The manner by which the communication interface 110 transmits the telemetry data or request for an upgrade is not particularly limited. In the present example, the client device 100 may connect with the apparatus 10 at a distant location over a network, such as the internet. In other examples, the communication interface 110 may connect to the apparatus 10 via a peer to peer connection, such as over a wired or private network. In the present example, the apparatus 10 is a central server. However, in other examples, the apparatus 10 may be a virtual server existing in the cloud where functionality may be distributed across several physical machines.

The memory storage unit 115 is coupled to the data collection engine 125 and may include a non-transitory machine-readable storage medium that may be any electronic, magnetic, optical, or other physical storage device. In the present example, the memory storage unit 115 may also maintain an operating system 150 which may be due for an upgrade in the example that the client device 100 is the requesting device. In other examples where the client device 100 is a source device, the operating system 150 may be the upgraded operating system.

The components 120 may be resources of the client device having a resource capacity. The components 120 are not particularly limited and may be any resource used by the client device 100. For example, the component 120-1 may be a memory module with a known memory capacity. The component 120-2 may be a processor, and the component 120-3 may be a graphics card. Each component may have specific characteristics, such as a capacity that may be measured in size or speed. In some examples, the component identifier, such as a specific processor model from a manufacturer may also be obtained.

The data collection engine 125 is to collect telemetry data from the memory storage unit 115 and components 120 within the client device 100. The information collected is not limited and may include information stored in the memory storage unit 115, such as system information or the version of the operating system 150. The information may also be collected directly from each component 120.

Figure 4:
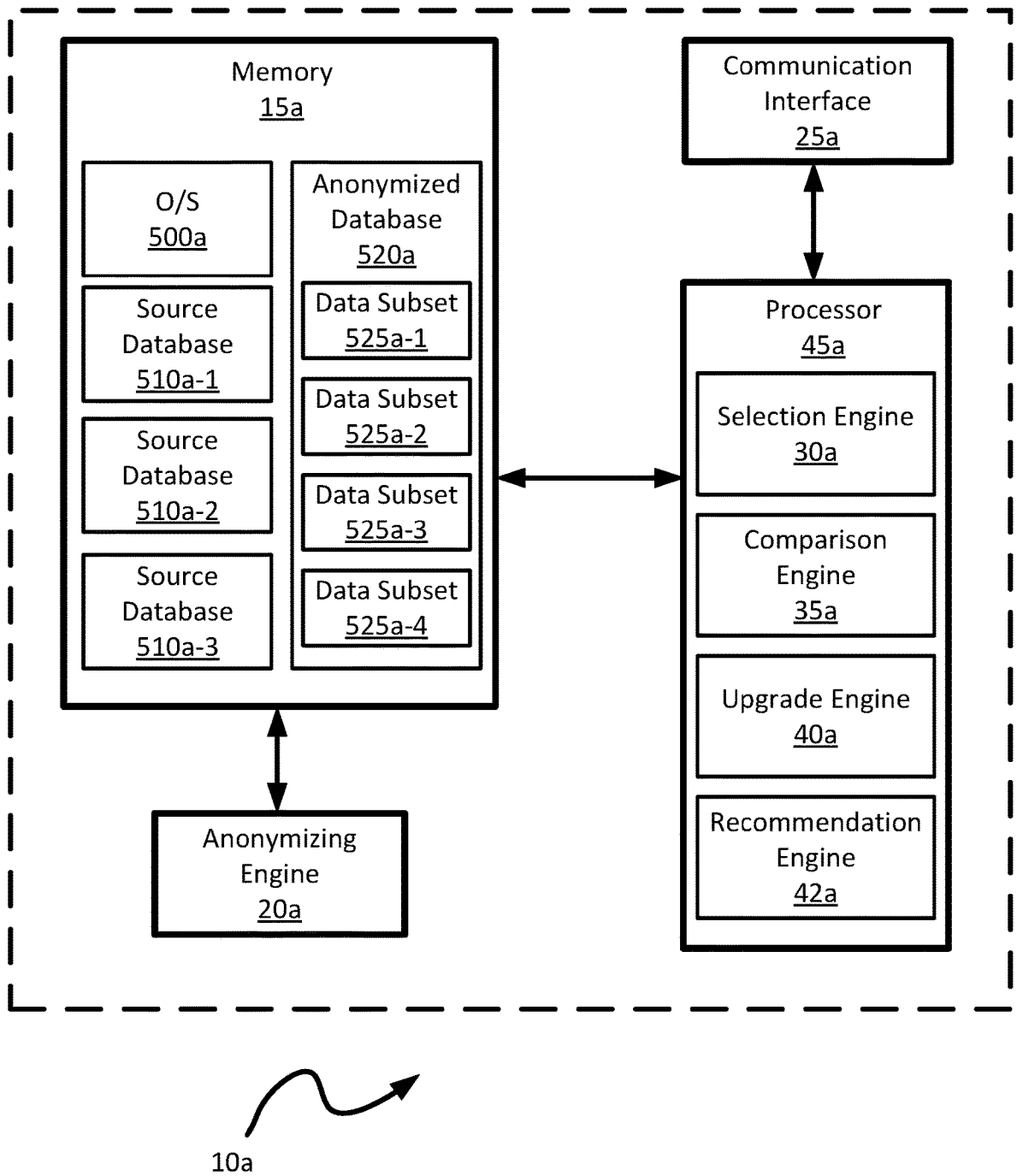
FIG. 4 is a block diagram of another example apparatus to manage client devices and the implementation of an upgrade at a client device

Referring to FIG. 4, an example of a system to manage client devices and the implementation of an upgrade at a client device is generally shown at 200. In the present example, the apparatus 10 is in communication with a plurality of client devices via networks 210, 220, 230. In this example, each the network 210, the network 220, and the network 230 may represent different sources where the sources are each isolated from each other. In particular, the client devices connected to the network 210 cannot see any client devices on the network 220 or the network 230. It is to be appreciated that the client devices are not limited and there may be a variety of client devices managed by the apparatus 10 via the networks 210, 220, 230.

Figure 5:
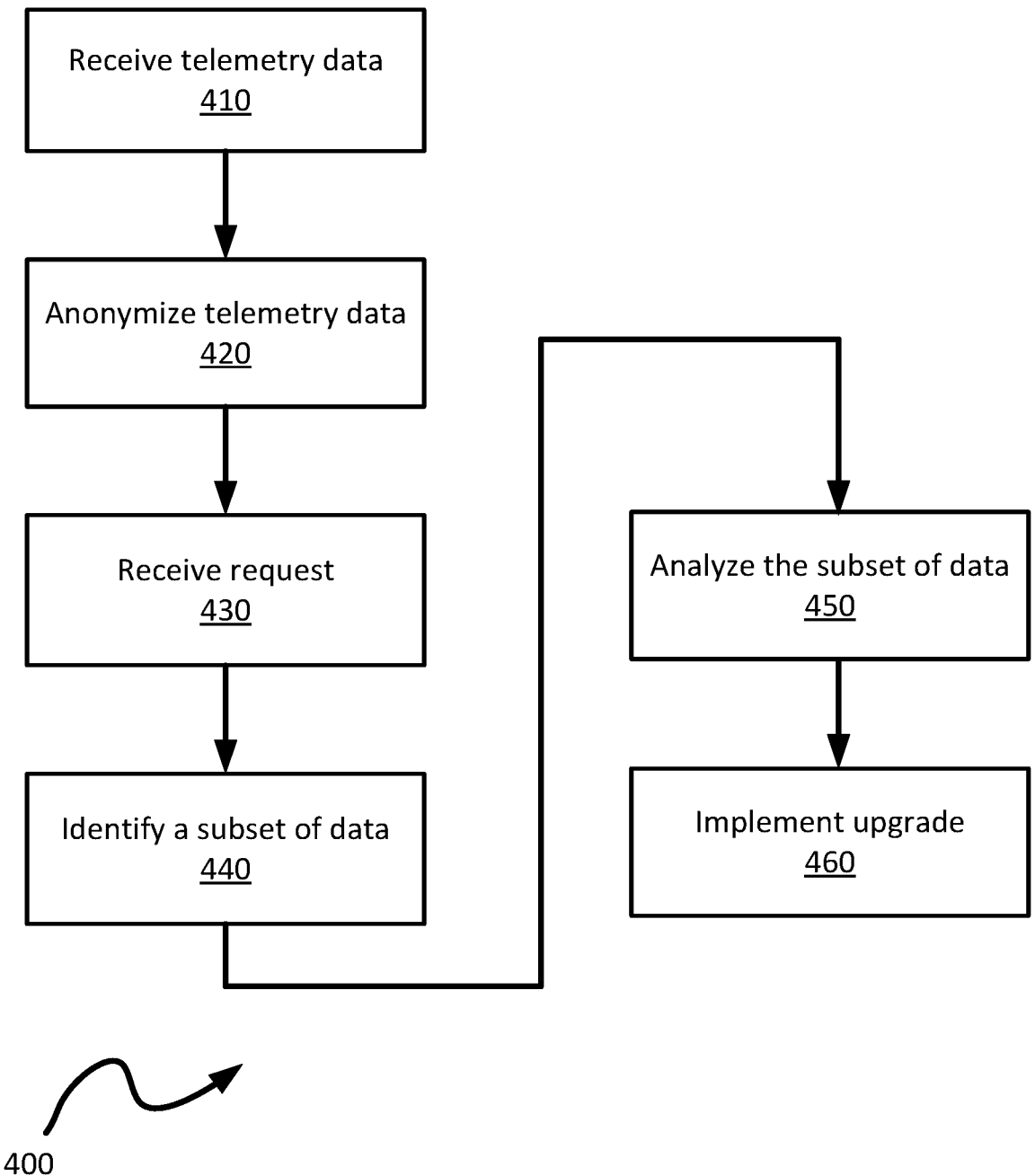
FIG. 5 is a flowchart of an example method of managing client devices and the implementation of an upgrade at a client device.

Referring to FIG. 5, another example an apparatus to manage client devices and the implementation of an upgrade at a client device is generally shown at 10a. Like components of the apparatus 10a bear like reference to their counterparts in the apparatus 10, except followed by the suffix "a". The apparatus 10a includes a memory storage unit 15a, an anonymizing engine 20a, a communication interface 25a, a selection engine 30a, a comparison engine 35a, an upgrade engine 40a, and a recommendation engine 42a. In the present example, the selection engine 30a, the comparison engine 35a, the upgrade engine 40a, and the recommendation engine 42a are implemented by a processor 45a. In other examples, the anonymizing engine 20a may also be implemented by the processor 45a.

The processor 45a may include a central processing unit (CPU), a graphics processing unit (GPU), a microcontroller, a microprocessor, a processing core, a field-programmable gate array (FPGA), an application-specific integrated circuit (ASIC), or similar. The processor 45a and the memory storage unit 15a may cooperate to execute various instructions. In the present example, the processor 45a may execute instructions stored on the memory storage unit 15a to implement the selection engine 30a, the comparison engine 35a, the upgrade engine 40a, and the recommendation engine 42a. In other examples, the selection engine 30a, the comparison engine 35a, the upgrade engine 40a, and the recommendation engine 42a may each be executed on a separate processor. In further examples, the selection engine 30a, the comparison engine 35a, the upgrade engine 40a, and the recommendation engine 42a may be operated on a separate machine, such as from a software as a service provider or in a virtual cloud server.

The memory storage unit 15a is to store various data and information on the apparatus 10a. The components of the memory storage unit 15a are not particularly limited. For example, the memory storage unit 15a may include a non-transitory machine-readable storage medium that may be, for example, an electronic, magnetic, optical, or other physical storage device. In addition, the memory storage unit 15a may store an operating system 500a that is executable by the processor 45a to provide general functionality to the apparatus 10a. For example, the operating system may provide functionality to additional applications. Examples of operating systems include Windows™, macOS™, iOS™, Android™, Linux™, and Unix™. The memory storage unit 15a may additionally store instructions to operate at the driver level as well as other hardware drivers to communicate with other components and peripheral devices of the apparatus 10a.

In the present example, the memory storage unit 15a may include source databases 510a-1, 510a-2, 510a-3 for storing telemetry data from different sources. For example, assuming the apparatus 10 of the system 200 is substituted with the apparatus 10a, the source databases 510a-1, 510a-2, 510a-3 may include telemetry data from the sources associated with the networks 210, 220 and 230, respectively. Accordingly, upon receiving the telemetry data via the communication interface 25a, the apparatus 10a may store the telemetry data in the databases 510a for subsequent searching when a request is for an upgrade is received.

In addition, the memory storage unit 15a may also include an anonymized database 520a for storing anonymized data generated by the anonymizing engine 20a. In the present example, the anonymized database 520a may be sub-divided into data subsets 525a-1, 525a-2, 525a-3, 525a-4. The division of the anonymized database 520a is not limited and may be performed by the selection engine 30a. For example, each time the selection engine carries out a selection of a subset, the subset may be stored in the anonymized database 520a for subsequent retrieval if a similar client device having the same configuration were to make a request. In another example, the data subsets 525a may be used as a crude filter to separate the data. For example, the data subset 525a-1 may include anonymized data from tablet devices. Furthermore, the data subset 525a-2 may include anonymized data from desktop computers. The data subset 525a-3 may be include anonymized data from smartphone, and the data subset 525a-4 may include anonymized data from all remaining devices.

In the present example, the recommendation engine 42a may be used to provide a recommendation to reduce the probability of an upgrade failure. Accordingly, the recommendation engine 42a may be used when the upgrade engine 40a processed a device with a probability of an upgrade failure above the predetermined threshold. The recommendation provided by the recommendation engine 42a may include a suggestion to increase a resource capacity at a client device, such as memory or processing power, by upgrading the hardware. The recommendation may be provided as a prompt to the user of the client device, or to the administrator of a device as a service provider.

Referring to FIG. 5, a flowchart of an example method to generating a suitability metric to determine if an upgrade is suitable for a client device is generally shown at 400. In order to assist in the explanation of method 400, it will be assumed that method 400 may be performed with the system 200. Indeed, the method 400 may be one way in which system 200 along with apparatus 10 and client device 100 may be configured. Furthermore, the following discussion of method 400 may lead to a further understanding of the system 200 and the apparatus 10 and client device 100. In addition, it is to be emphasized, that method 400 may not be performed in the exact sequence as shown, and various blocks may be performed in parallel rather than in sequence, or in a different sequence altogether.

Referring to FIG. 5, a flowchart of an example method of managing client devices and the implementation of an upgrade at a client device is generally shown at 400. In order to assist in the explanation of method 400, it will be assumed that method 400 may be performed with the system 200. Indeed, the method 400 may be one way in which system 200 along with an apparatus 10 and client device 100 may be configured. Furthermore, the following discussion of method 400 may lead to a further understanding of the system 200 and the apparatus 10 and client device 100. In addition, it is to be emphasized, that method 400 may not be performed in the exact sequence as shown, and various blocks may be performed in parallel rather than in sequence, or in a different sequence altogether.

Beginning at block 410, telemetry data is received from the client devices belonging to different sources. In the present example, the sources are isolated from each other such the no information may be directed or indirectly shared with another source.

Block 420 comprises anonymizing the telemetry data received at block 410 to generate anonymized data. In the present example, anonymizing the telemetry data involves removing identifying information from the telemetry data to generate anonymized data. The anonymizing engine 20 may remove confidential information from the telemetry data, but maintains all other information of the telemetry data, such as the general hardware configuration of the client device which may contribute to the probability of an upgrade failure due to incompatible resources on the client device. For example, confidential information of the client device may include personal information that may be part of certain applications, as well as identification information that may associate a client device with a specific source, such as device identifiers, network information, and names and device history. In this example, the hardware configuration may include information such as the type or model of the client device, the memory capacity, the model or type of processor as well as the speed of the processor, the graphics card, and other installed components of the client device.

Block 430 comprises receiving a request from a client device for an upgrade. In the present example, the client device also provides the device configuration of the client device.

The device configuration received from block 430 is used at block 440 to identify a subset of the anonymized data generated at block 420. The identification of the subset of the anonymized data is not limited and may be carried out to identify data from client devices across multiple sources with a device configuration similar to the device configuration of the requesting device received at block 430. The degree of similarity between the source devices providing telemetry data at block 410 and the requesting device providing the request at block 430 is also not particularly limited and may be based on predetermined thresholds. For example, source client devices may be identified if the source device has substantially identical memory capacities as the requesting device.

Block 450 comprises analyzing the subset of the anonymized data identified at block 440 to determine a probability of an upgrade failure at the client device. The manner by which the probability of an upgrade failure is determined is not limited. For example, a simple percentage of all source devices in the subset of anonymized data identified at block 440 where the upgrade was not carried out successfully may be calculated. The definition of an unsuccessful upgrade is not limited and may be dependent on the request originally received by the communication interface. For example, an unsuccessful upgrade may be defined as an upgrade where the device is rendered inoperable, often referred to as bricking. In other examples, an unsuccessful upgrade may generate error screens on the device such that the upgrade is rolled back. In another example, an unsuccessful upgrade may result in a device that operates with significant lags and provides a user experience that is below a certain level that may be subjective to the user or objectively measured.

Block 460 involves implementing an upgrade at the client device based on the probability. For example, the upgrade engine 40 may prompt a user of the client device to download and install the upgrade upon approval based on the probability of an upgrade failure. In other examples, the may be pushed to the client device without further input from the user, such as in a managed client device.

Figure 6:
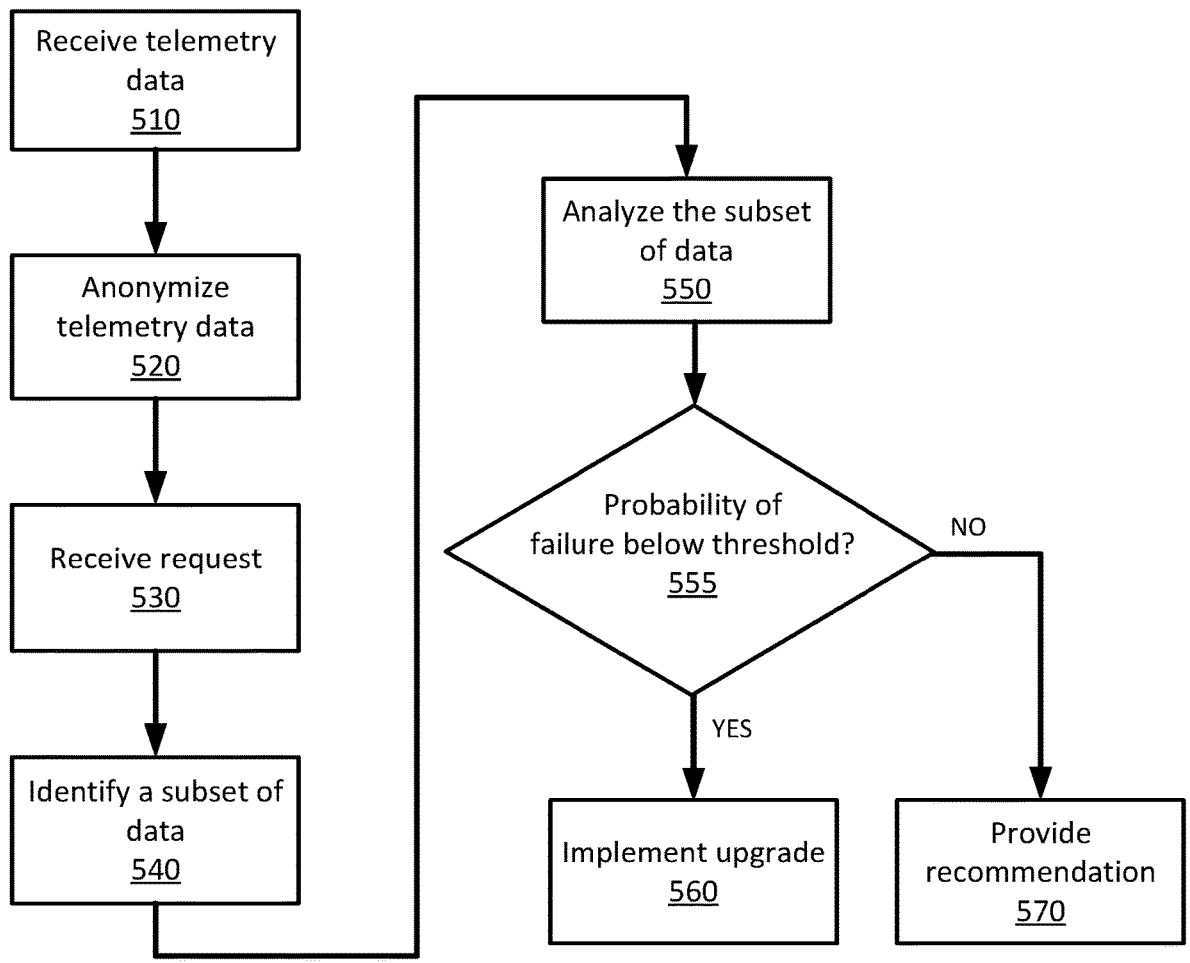
FIG. 6 is a flowchart of another example method of managing client devices and the implementation of an upgrade at a client device.

Referring to FIG. 6, a flowchart of another example method of managing client devices and the implementation of an upgrade at a client device is generally shown at 500. In order to assist in the explanation of method 500, it will be assumed that method 500 may be performed with the apparatus 10*a*. Indeed, the method 500 may be one way in which apparatus 10*a* may be configured. altogether. In addition, the method 500 also shares common blocks with the method 400.

Beginning at block 510, telemetry data is received from the client devices belonging to different sources similar to the execution of block 410.

Block 520 comprises anonymizing the telemetry data received at block 510 to generate anonymized data similar to the execution of block 420.

Block 530 comprises receiving a request from a client device for an upgrade. In the present example, the client device also provides the device configuration of the client device.

Block 540 identifies a subset of the anonymized data generated at block 520. In the present example, block 540 is similar in operation as block 440.

Block 550 comprises analyzing the subset of the anonymized data identified at block 540 to determine a probability of an upgrade failure at the client device similar to the execution of block 450.

Block 555 involves determining whether the probability of an upgrade failure determined at block 550 is below a threshold. The determination of the threshold value is not particularly limited and may be determined based on empirical data. If the probability of an upgrade failure is below the threshold value, the method will proceed to block 560, which operates similar to block 460.

If the probability of an upgrade failure is above the threshold value, the method will proceed to block 570. Block 570 involves providing a recommendation to the reduced the probability of an upgrade failure. The recommendation provided may include a suggestion to increase a resource capacity at a client device, such as memory or processing power, by upgrading the hardware. The recommendation may be provided as a prompt to the user of the client device, or to the administrator of a device as a service provider.

Various advantages will now become apparent to a person of skill in the art. For example, the system 200 provides a manner by which the effects of a major upgrade may be predicted based on empirical data collected from a large number of devices. By collecting data and anonymizing the data from across multiple sources, the dataset is further increased to improve accuracy.

It should be recognized that features and aspects of the various examples provided above may be combined into further examples that also fall within the scope of the present disclosure.

What is claimed is:

1. An apparatus comprising:
a memory storage unit to store telemetry data collected from a plurality of sources via a computer network, wherein each source of the plurality of sources includes a network of client devices that maintains confidentiality with respect to another source of the plurality of sources;
an anonymizing engine to remove identifying information from the telemetry data to generate anonymized data;
a communication interface to receive via the computer network a request from a client device for an upgrade, wherein the request includes a requesting device configuration of the client device, wherein the requesting device configuration includes a memory capacity and processing speed of the client device;
a selection engine to select a subset of the anonymized data based on the requesting device configuration;
a comparison engine to analyze the subset of the anonymized data to determine a probability of an upgrade failure at the client device, wherein the probability is weighted based on a similarity between the requesting device configuration and a source device configuration that includes a memory capacity and a processor speed of a source device described by the subset of the anonymized data;
an upgrade engine to implement the upgrade on the client device via the computer network on when the probability is below a threshold; and
a recommendation engine to provide a recommendation to reduce the probability of the upgrade failure when the probability is above the threshold.

2. The apparatus of claim 1, wherein the recommendation is to increase a resource of the client device.

3. The apparatus of claim 2, wherein resource is memory.

4. A method comprising:
receiving telemetry data from a first source and a second source via a computer network, wherein the first source includes a first plurality of source devices and the second source includes a second plurality of source devices, wherein the first source and the second source are isolated from each other;
anonymizing the telemetry data to generate anonymized data;
receiving via the computer network a request from a client device for an upgrade, wherein the request includes a requesting device configuration of the client device, wherein the requesting device configuration includes a memory capacity and processing speed of the client device;
identifying a subset of the anonymized data, wherein the subset includes anonymized data from source devices with a source device configuration including a memory capacity and processing speed similar to the memory capacity and processing speed of the requesting device configuration;
analyzing the subset of the anonymized data to determine a probability of an upgrade failure at the client device, wherein the probability is weighted based on a similarity between the requesting device configuration and the source device configuration; and
implementing the upgrade at the client device via the computer network or providing a recommendation to reduce the probability of the upgrade failure, as selected based on the probability.

5. The method of claim 4, wherein the recommendation is provided if the probability is above a predetermined threshold.

6. A non-transitory machine-readable storage medium encoded with instructions executable by a processor, the non-transitory machine-readable storage medium comprising:
instructions to receive telemetry data from a plurality of sources via a computer network, wherein each source of the plurality of sources includes a network of source devices that maintains confidentiality with respect to another source of the plurality of sources;
instructions to anonymize the telemetry data to generate anonymized data;
instructions to receive via the computer network a request from a client device for an upgrade, wherein the request includes a requesting device configuration of the client device, wherein the requesting device configuration includes a memory capacity and processing speed of the client device;
instructions to identify a subset of the anonymized data, wherein the subset includes anonymized data from source devices with a source device configuration including a memory capacity and processing speed similar to the memory capacity and processing speed of the requesting device configuration;
instructions to analyze the subset of the anonymized data to determine a probability of an upgrade failure at the client device, wherein the probability is weighted based on a similarity between the requesting device configuration and the source device configuration;
instructions to implement the upgrade at the client device via the computer network if the probability is below a predetermined threshold; and
instructions to provide a recommendation to reduce the probability of the upgrade failure if the probability is above the predetermined threshold.

* * * * *